Feb. 6, 1934.  M. FERRANDINO  1,945,849
AUTOMATIC MEASURING AND DISPENSING DEVICE
Filed March 2, 1932  2 Sheets-Sheet 1
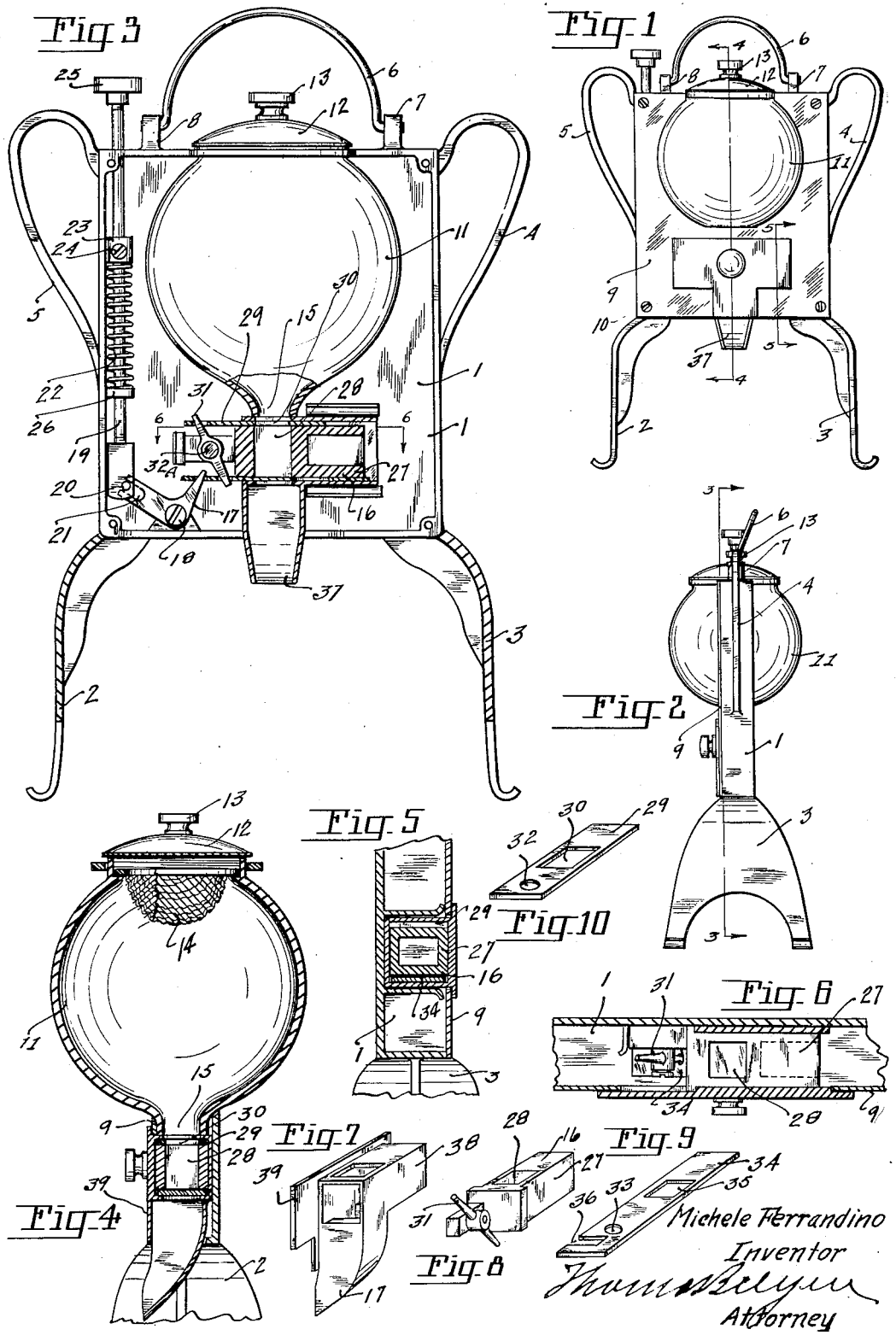

Feb. 6, 1934.   M. FERRANDINO   1,945,849
AUTOMATIC MEASURING AND DISPENSING DEVICE
Filed March 2, 1932   2 Sheets-Sheet 2
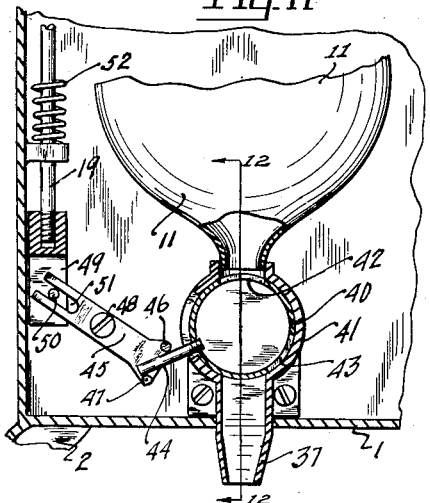
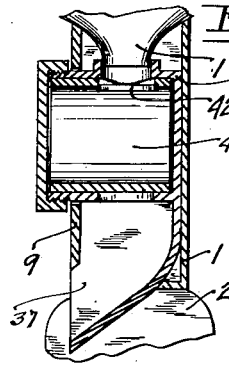
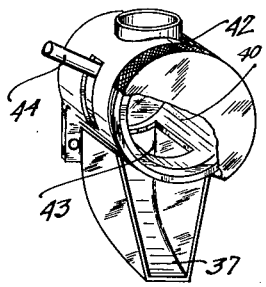
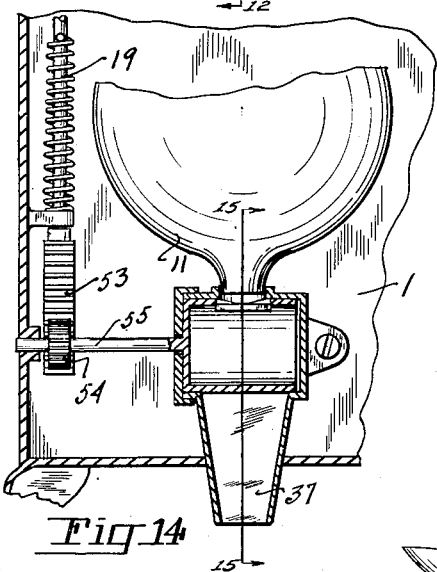
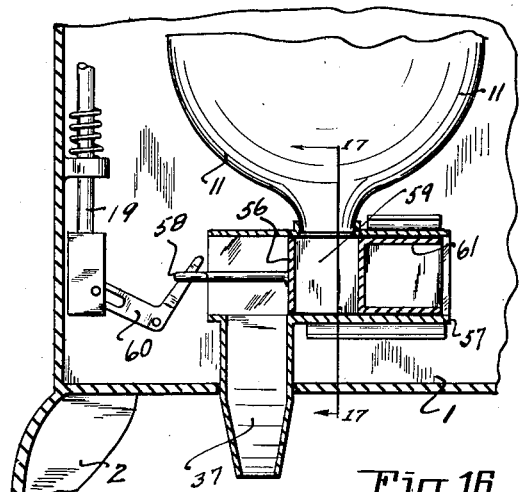
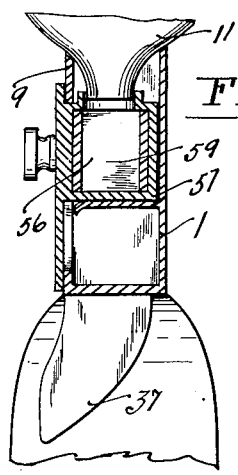
Michele Ferrandino
Inventor
Attorney Patented Feb. 6, 1934

1,945,849

UNITED STATES PATENT OFFICE 1,945,849

AUTOMATIC MEASURING AND DISPENSING DEVICE

Michele Ferrandino, Corbett, Oreg.

Application March 2, 1932. Serial No. 596,249

1 Claim. (Cl. 221—104)

My invention relates to self-measuring devices, as sugar bowls.

The device is comprised of an ornamental body that is leg supported. Hand engaging handles are disposed at either side of the body and a bail is disposed at the top to facilitate moving the measuring device from place to place, as desired. A bowl comprises the major part of the body and is used as a receptacle for the storing of commodities to be dispensed through the device.

An automatic measuring device is associated with the bowl and is disposed within the body element, that will automatically measure a predetermined amount of the material to be dispensed.

An actuating knob is disposed within the body and upwardly extends through the top, that is adapted for actuating the device for complete cycles of operation, to thereby dispense the commodity to be served.

A pouring spout is disposed in the base and is downwardly sloping. As the measured amount of material is dispensed, the same is deposited in the spout. The spout is placed sufficiently high to permit the coffee cup or other receptacle being placed thereunder to receive the commodity being dispensed.

One of the objects of my invention consists in providing an ornamental structure adapted for holding and storing a substantial amount of the commodity, as sugar, to be dispensed. The device being of fine appearance and easily moved to accommodate itself to the greatest number.

A still further object of my invention consists in providing a simply constructed device that is comprised of few parts and one that may be used and moved at the will of the operator, irrespective of the location.

A still further object of my invention consists in providing a device that may be used for the dispensing of a measured amount of a commodity. A storage bin, or bowl is provide, and comprises the major portion of the device. The bowl is adapted for being easily filled, from time to time.

A still further object of my invention consists in so constructing my device that the same may be used by the general public over relatively long operating periods with freedom from mechanical annoyances.

A still further object of my invention consists in constructing a measuring device entirely of metal, to facilitate the maintaining of the same in a highly sterile and sanitary condition.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a front view of the assembled device.

Fig. 2 is a side view of the assembled device.

Fig. 3 is a sectional, side view of the assembled device. The same being taken on line 3—3 of Fig. 2, looking in the direction indicated.

Fig. 4 is a fragmentary, sectional side view of the assembled device. The same being taken on line 4—4 of Fig. 1, looking in the direction indicated.

Fig. 5 is a fragmentary, sectional end view of the automatic measuring mechanism. The same being taken on line 5—5 of Fig. 1, looking in the direction indicated.

Fig. 6 is a fragmentary, top plan view of the automatic measuring device. The same being taken on line 6—6 of Fig. 3, looking in the direction indicated.

Fig. 7 is a perspective, end view of the measuring housing and of the spout and closure plate. The same being shown removed from the body of the device.

Fig. 8 is a perspective, end view of the measuring plunger shown removed from the mechanism illustrated in Fig. 7.

Fig. 9 is a perspective, end view of one of the slides shown removed from the actuating mechanism.

Fig. 10 is a perspective, end view of the other one of the slides. The slides 9 and 10 being adapted for being maintained within the assembly and for being moved longitudinally of the assembly, by the actuating mechanism.

Fig. 11 is a fragmentary, sectional, front view of the bowl and of a slightly modified form of measuring device.

Fig. 12 is a sectional, side view of the mechanism illustrated in Fig. 11. The same being taken on line 12—12 of Fig. 11, loking in the direction indicated.

Fig. 13 is a perspective, end view of the measuring device and the bin, or bowl, shown removed from the assembly. The same being the mechanism as illustrated in Figs. 11 and 12.

Fig. 14 is a fragmentary, front view, partially in section of a still further modified form of measuring device.

Fig. 15 is a fragmentary, sectional end view of

Fig. 16 is a fragmentary, sectional, front view of a still further modified form of an automatic measuring device, that is adapted for being used in conjunction with my dispensing device.

Fig. 17 is a fragmentary, sectional side view of the device that is illustrated in Fig. 16. The same being taken on line 17—17 of Fig. 16, looking in the direction indicated.

Like reference characters refer to like parts throughout the several views.

My device is comprised primarily of a body element 1. Supporting legs 2 and 3 are disposed at the oppositely disposed sides of the body element 1.

Ornamental handles 4 and 5 are disposed at the oppositely disposed sides of the body element. A bail 6 upwardly extends from the top of the body element and is hingedly secured thereto by being journaled within lugs 7 and 8 that upwardly extend from the top of the body element. The handles and the bail are so positioned that the dispenser may be engaged from either side of the top, for moving the same.

A closure plate 9 is adapted to one side of the body element and is removably secured thereto through the use of fastening screws 10. A bowl or bin 11, comprises the major part of the body element and the same is adapted for being filled through a removable lid 12.

An engaging knob 13 upwardly extends from the central portion of the lid to facilitate the handling of the same.

A removable screen 14 is disposed within the entrance-way of the bowl in order that the sugar, or other material to be placed within the bowl may be screened in advance of its entry into the bowl. The walls of the bowl are downwardly converging to a central discharge outlet 15. A plunger 16 is adapted for being moved transversely of the body element.

A bell crank 17 is rockably disposed within the body element and is adapted for being partially rotated about a supporting journal pin 18.

An actuating rod 19 is disposed vertically within the body element and a pin 20 is adapted for being actuated within a slot 21 of the bell crank 17. The actuating rod has a reacting element, as a coil spring 22 disposed thereabout, one end of the reacting elements is limited in its movement about an adjustable stop 23. The adjustable stop being fixedly positioned at the desired location upon the actuating rod, by a set screw 24.

An actuating knob 25 terminates the outer, upper end of the actuating rod. The lower end of the reacting element 22 rests directly upon a lug 26. The purpose of the reacting element is to maintain the actuating rod in raised position and the dispensing plunger 27 so positioned that the measuring compartment 28 of the same will be in registry and in alignment with the discharge outlet 15 of bowl 11.

A movable slide 29 is disposed above the plunger 27 and an opening 30 is disposed within the slide 29 and is normally in registry with the measuring compartment 28 and with the discharge outlet of the bowl 11.

A wing lever 31 is rockably disposed about a pin 32A. One end of the wing lever 31 passes through a hole 32 of the slide 29, as illustrated in detail in Fig. 10. The oppositely disposed end of the wing lever passes through a hole 33 of the slide 34 and a discharge outlet 35 is disposed within the slide 34.

An actuating slot 36 is also disposed within the slide 34 and as the bell crank 17 is actuated by pressure being applied upon the knob 25, the slide 34 is moved longitudinally and simultaneously therewith.

As soon as the opening 30, disposed within the slide 29, is placed out of registry with the opening 15 of the bowl, to stop the flow of material to be dispensed through the opening 35, the slide 34 is placed in registry with the dispensing compartment 28 and the total contents of the product in the dispensing compartment 28 flows therefrom through the discharge chute 37.

The lower end of the discharge chute 37 is sufficiently spaced above the supporting structure upon which the legs 2 and 3 rest, that the same will be permitted to flow directly into the coffee cup, porridge bowl, or any other receiving receptacle.

The plunger 16 is slidably disposed within a housing 38. The housing 38 and the dispensing spout 17 are directly secured to a closure plate 39 and the assembly may be removed from the body element as desired. When doing so the slot 36, disposed within the slide 34, is permitted to be disengaged from the leg of the actuating bell crank 17.

The measuring compartment may be comprised of a sleeve 40 that is partially rotatable within a suitable barrel housing 41. An inlet port 42 is disposed within the top side of the sleeve and a discharge port 43 is disposed at the bottom side of the sleeve. The inlet port 42 is normally maintained in registry with the discharge outlet of the receptacle 11, and the discharge outlet is normally out of registry with the chute 37.

A pin 44 outwardly extends from the sleeve 40, and a bell crank 45 has a pair of pins 46 spaced apart within one end of the bell crank 45 through which the actuating pin 44 is disposed. The bell crank 45 is rockably disposed about a journal pin 48. The actuating rod 19 has a head 49 disposed upon its lower end, and a pin 50 is secured to the head and extends through the slot 51 of the bell crank 45. A reacting element 52 normally maintains the port 42 of the sleeve 40 in registry with the discharge outlet of the receptacle.

A rack 53 and a pinion 54, that is mounted upon the shaft 55, may be utilized for the rotating of the sleeve and for accomplishing the result as heretofore described.

A still further modified form of device may be made of a plunger 56 that is adapted for being moved longitudinally within guideway 57. A stem 58 outwardly extends from the head of the plunger and the measuring compartment 59 is normally in registry with the discharge outlet of the receptacle 11. The stem 58 is adapted for being actuated by the bell crank 60. The bell crank is actuated by the mechanism heretofore described. The measuring compartment is adapted for being moved into registry with the discharge outlet 37 and when the same is in registry with the discharge outlet the measuring receptacle is closed from the top side of the plunger engaging the same.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claim which follows.

What I claim is:

In a device of the class described, the combination of a leg supported frame, a bowl mounted within the frame and occupying a space from the top thereof to a point near the bottom thereof, a discharge outlet formed in the bottom of the bowl, a casing secured to the frame beneath the bowl, an apertured cylinder rotatably mounted within the frame, a discharge chute formed at the bottom of the casing, and means for rotating said cylinder from a receiving to a discharging position, said means comprising a shaft extending outwardly from one end of the cylinder, a pinion gear secured to the end of the shaft, a gear rack slidably mounted within the frame and coacting with said pinion gear.

MICHELE FERRANDINO.